Figure 1:
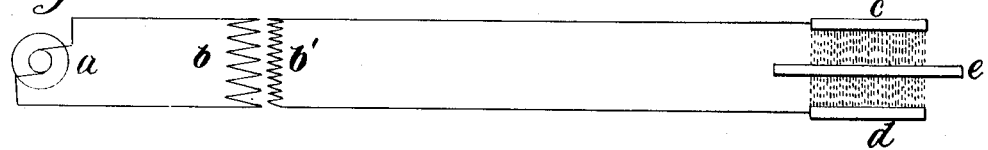
Figure 1:
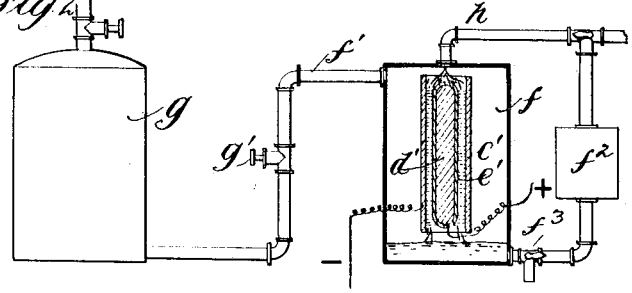
Figure 1:
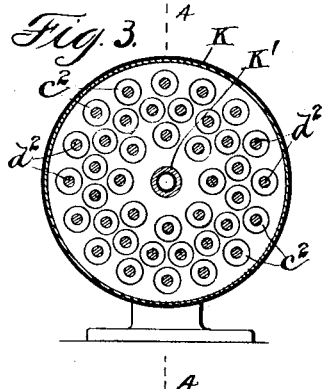
Figure 1:
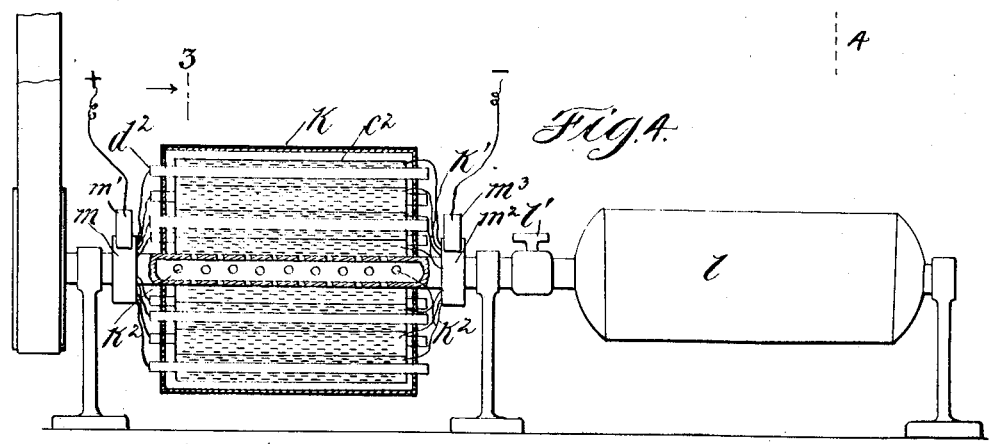
Figure 1:

(No Model.)

W. LOBACH.
ELECTRICAL PRODUCTION OF CHEMICAL REACTIONS.

No. 563,288.　　　　　　　　Patented July 7, 1896.

Witnesses:
George L. Cragg
W. Clyde Jones

Inventor:
Walter Lobach
By Barton & Brown
Attorneys.

UNITED STATES PATENT OFFICE.

WALTER LOBACH, OF CHICAGO, ILLINOIS.

ELECTRICAL PRODUCTION OF CHEMICAL REACTIONS.

SPECIFICATION forming part of Letters Patent No. 563,288, dated July 7, 1896.

Application filed November 30, 1894. Serial No. 530,306. (No model.)

*To all whom it may concern:*

Be it known that I, WALTER LOBACH, a subject of the German Emperor, residing at Chicago, in the county of Cook and State of Illinois, have invented a certain new and useful Improvement in Electrical Production of Chemical Reactions, (Case No. 2,) of which the following is a full, clear, concise, and exact description, reference being had to the accompanying drawings, forming a part of this specification.

My invention relates to the electrical production of chemical reactions; my object being to provide means whereby through the agency of the so-called "silent" discharge I may produce the reactions of gases upon liquid and solid substances; my invention being particularly adapted to the oxidation of substances such as oils, which it is desired to bleach, the oils or other liquid or solid substances being brought into the path of the electrical discharge, whereby they are subjected to the action of the oxygen in the nascent or most active state.

It has been proposed heretofore to subject air or oxygen to the action of the electrical discharge by passing the air or oxygen between electrodes across which the discharge is taking place, the oxygen being conveyed away and stored in the form of ozone. Oxygen in the form of ozone is much more active as an oxidizing or reducing agent than is oxygen in its stable form, and ozone will react upon some substances that will not be affected by oxygen. It has been proposed to utilize ozone, thus produced, for bleaching oils, and for other processes of reduction and oxidation.

It is the object of my invention to provide means whereby the oils or other substances may be brought into contact with the oxygen when in a more active condition than when in the form of ozone, and for this purpose I pass between the electrodes not only the product from which the nascent oxygen is to be formed, but also the oils or other liquid or solid substances, whereby they come into contact with and are acted upon by the oxygen at the moment of formation when it most readily combines with other substances. I am thus enabled to greatly facilitate the process, and I can bleach oils in two or three hours that require from two to three days for bleaching when ozone is employed.

My invention is not alone applicable to oxidizing and reducing processes, but may be employed where it is desired to cause other gases to react upon liquid or solid substances. Thus I have found that hydrogen removes oxygen more readily from compounds containing it when such compounds are subjected to hydrogen thus formed in the nascent state.

Referring to the accompanying drawings, Figure 1 is a diagram illustrative of my invention. Fig. 2 is a view of apparatus embodying my invention. Fig. 3 is a sectional view on the line 3 3, Fig. 4, of a modified form of my invention. Fig. 4 is a sectional view on line 4 4, Fig. 3. Fig. 5 is a detail view of one of the parts shown in Fig. 3. Fig. 6 is a sectional view on line 6 6, Fig. 5.

Like letters refer to like parts throughout the different figures.

As illustrated in Fig. 1, a source $a$ of very rapidly-alternating currents is connected in circuit with the primary $b$ of a transformer, the secondary $b'$ of which is connected with plates $c$ $d$, placed at a distance apart and separated by a plate $e$ of dielectric material. The alternating current of high frequency produces a discharge between the plates $c$ and $d$, and, if oxygen or air be passed between the plates, oxygen in the nascent state will be formed. If now a substance, as, for instance, oil, be passed between the electrodes, it will come in contact with the oxygen in the nascent state, and the reaction will be more intense than if the oil be subjected to the action of the oxygen after it has assumed the semistable form of ozone.

In Fig. 2 I have shown means for providing a continuous supply of the reacting substance. Within a chamber $f$ is provided an electrode $c'$, in the form of a tube or hollow cylinder, which is connected with one pole of the current-generator, thus corresponding to plate $c$ of Fig. 1. Within the tube is an electrode $d'$, in the form of a rod and connected with the opposite pole of the generator, thus corresponding to plate $d$ of Fig. 1. The electrode $d'$ is surrounded by a layer $e'$ of dielectric material, which serves the purpose of plate $e$ of Fig. 1, a space being left between the outer surface of the layer of dielectric material and the interior of tube $c'$. The chamber $f$ is connected by a pipe $f'$ with a gas-reservoir $g$, containing the gas to be used as the reagent, a valve $g'$ being placed in pipe $f'$ for varying the pressure of the gas passing to chamber $f$. Above electrode $d'$ is provided the mouth of a pipe $h$, which conveys the liquid to be acted upon to the chamber $f$, where it is discharged upon the top of electrode $d'$, flowing down between the two electrodes. The gas from reservoir $g$ passes also between the two electrodes, being broken up under the influence of the discharge, and passing into the nascent state, in which state it readily unites with the liquid flowing downward between the electrodes, the liquid being thus changed in its chemical nature and passing to the bottom of receptacle $f$, from whence it may be withdrawn by a pump $f^2$ and again passed through pipe $h$ and subjected to the discharge. When the chemical nature of the liquid has been changed in the required degree, the liquid may be drawn off through valve $f^3$.

In Figs. 3, 4, 5, and 6 I have illustrated a modified form of apparatus, means being provided for bringing the reacting substances more intimately into contact. This is the apparatus I employ in practice. A chamber $k$ is mounted upon a hollow shaft $k'$, the hollow shaft communicating with the chamber by means of openings $k^2 k^2$. To the end of the hollow shaft is connected a reservoir $l$, mounted to rotate with chamber $k$, a valve $l'$ being provided between reservoir $l$ and chamber $k$ for controlling the pressure of the gas. Within the chamber $k$ is provided a series of rods $d^2$, supported in the ends of chamber $k$, the rods being covered with a layer $e^2$ of dielectric material and surrounded by tubes $c^2$, which are mounted upon the rods $d^2$, but insulated therefrom. The tubes $c^2$ are provided with perforations in their surfaces to permit access to the space within the tubes $c^2$. The rods $d^2$ are electrically connected with a collecting-ring $m$, mounted upon the shaft $k'$, upon which ring bears a brush $m'$, connected to one pole of the generator. The tubes $c^2$ are electrically connected with ring $m^2$, upon which bears brush $m^3$, connected with the opposite pole of the generator. The rods $d^2$ and tubes $c^2$ thus serve as the electrodes between which the silent discharge takes place.

In the operation of the apparatus, the chamber $k$ is filled with the liquid to be operated upon to a level somewhat below shaft $k'$, and the valve $l'$ is opened to the required degree to admit the gas at the proper pressure. The pressure of the gas will be determined by the nature of the substances operated upon, the most efficient pressure being determined by experiment for each specific case. The gas occupying a position between the electrodes is changed into the nascent state under the influence of the discharge, and as the chamber $k$ rotates the liquid is carried upward by the tubes $c^2$, the liquid thus coming into contact with the freed atoms of the reacting gas and being acted upon thereby, the liquid then trickling out of the tubes through the perforations returning to the lower end of the chamber $k$, where it is again picked up by the tubes and subjected to the influence of the reacting agent, the operation being thus continued until the chemical nature of the liquid has been changed, as desired.

It is preferable in practicing my invention to secure the reacting agent in a gaseous state, as it may then be more readily converted into the nascent state under the influence of the discharge. The substance to be operated upon may be more readily handled when in the form of a liquid.

I am aware that it has been proposed heretofore to pass mixed gases between two electrodes, thus subjecting the mixed gases to the action of the electrical discharge and causing the same to combine chemically. (Letters Patent No. 523,263, dated July 17, 1894.)

Having thus described my invention, what I claim as new, and desire to secure by Letters Patent, is—

1. The herein-described process of bleaching oils which consists in producing an electrical discharge between two electrodes, passing oxygen or an oxygen product between the electrodes to produce oxygen in the nascent state, and passing the oil between said electrodes and into contact with the oxygen while in the nascent state, substantially as described.

2. The herein-described process of producing the reaction of oxygen upon a non-gaseous substance which consists in producing an electrical discharge between two electrodes, passing oxygen or an oxygen product between the electrodes to produce oxygen in the nascent state, passing the substance to be acted upon between said electrodes, and sprinkling or scattering said substance into the oxygen or oxygen product while between said electrodes so as to bring it into intimate contact with said oxygen in the nascent state, substantially as described.

3. The herein-described process of producing the reaction of oxygen upon a non-gaseous substance which consists in producing an electrical discharge between two electrodes, passing oxygen or an oxygen product between the electrodes to produce oxygen in the nascent state, passing the substance to be acted upon between said electrodes, and agitating the substance while between said electrodes so as to bring it into intimate contact with said oxygen in the nascent state, substantially as described.

4. The herein-described process of producing the reaction of a gas upon a non-gaseous substance which consists in producing an electrical discharge between two electrodes, passing the gas or the gas product between said electrodes to produce the gas in the nascent state, passing the non-gaseous substance to be acted on between said electrodes, and sprinkling or scattering said substance into the gas or the gas product while between said electrodes so as to bring it into intimate contact with the gas in the nascent state, substantially as described.

5. The herein-described process of producing the reaction of a gas upon a non-gaseous substance which consists in producing an electrical discharge between two electrodes, passing the gas or the gas product between said electrodes to produce the gas in the nascent state, passing the non-gaseous substance to be acted on between said electrodes, and agitating the substance while between said electrodes so as to bring it into intimate contact with the gas in the nascent state, substantially as described.

6. The combination with a chamber containing electrodes between which an electrical discharge is adapted to be formed, of a gas-supply pipe communicating with said chamber, and adapted to pass the gas between said electrodes, and independent means for passing a liquid or solid substance through the space between said electrodes, whereby the liquid or solid substance is brought into intimate contact with the gas in the nascent state, substantially as described.

7. The combination with a chamber containing electrodes between which an electrical discharge is adapted to be formed, of a gas-supply pipe communicating with said chamber, and adapted to pass the gas between said electrodes, and a discharge-pipe for a non-gaseous substance arranged to discharge the latter between said electrodes, and provided with means for scattering or sprinkling the same into the gas, whereby said substance comes in contact with the gas in the nascent state, substantially as described.

8. The combination with a chamber, of electrodes contained therein and comprising a central electrode, and an electrode surrounding the same, between which electrodes an electrical discharge is adapted to be formed, means for passing a gas or gas product between said electrodes, and independent means for passing a liquid or solid substance between said electrodes, whereby the liquid or solid substance is brought into intimate contact with the gas in the nascent state, substantially as described.

9. The combination with a chamber, of electrodes therein between which an electrical discharge is adapted to be formed, means for passing a gas or gas product between said electrodes, means for passing a non-gaseous substance between said electrodes, and means for agitating the latter substance in the presence of the gas, substantially as described.

10. The combination with the chamber $k$ mounted upon the hollow shaft $k'$, of the gas-reservoir $l$ communicating therewith through said hollow shaft, rods $d^2$ and perforated tubes $c^2$ mounted in said chamber $k$ and forming the opposite terminals of an electric circuit, and dielectric material between the respective rods and tubes, substantially as described.

In witness whereof I hereunto subscribe my name this 26th day of November, A. D. 1894.

WALTER LOBACH.

Witnesses:
W. CLYDE JONES,
GEORGE L. CRAGG.